United States Patent
Park et al.

(10) Patent No.: US 7,755,851 B2
(45) Date of Patent: Jul. 13, 2010

(54) SUBMINIATURE IMAGING OPTICAL SYSTEM

(75) Inventors: Cheon Ho Park, Gyunggi-do (KR); Phil Ho Jung, Gyunggi-do (KR); Jae Cheol Jeong, Gwangju (KR); Sadao Okudaira, Saitama (JP)

(73) Assignees: Samsung Electro-Mechanics Co., Ltd., Suwon (KR); Okudaira Saiteki System Laboratory, Saitama (JP)

( * ) Notice: Subject to any disclaimer, the term of this patent is extended or adjusted under 35 U.S.C. 154(b) by 114 days.

(21) Appl. No.: 12/073,460

(22) Filed: Mar. 5, 2008

(65) Prior Publication Data

US 2008/0225408 A1    Sep. 18, 2008

(30) Foreign Application Priority Data

Mar. 13, 2007    (KR) .................. 10-2007-0024274

(51) Int. Cl.
 *G02B 3/02* (2006.01)
 *G02B 13/18* (2006.01)

(52) U.S. Cl. ........................... 359/715; 359/775
(58) Field of Classification Search ............... 359/708, 359/713–715, 754–757, 763–765, 771, 772, 359/775
 See application file for complete search history.

(56) References Cited

U.S. PATENT DOCUMENTS

| 2,418,001 | A | * | 3/1947 | Warmisham et al. ........ 359/775 |
| 2,865,252 | A | * | 12/1958 | Reiss ...................... 359/775 |
| 3,370,904 | A | * | 2/1968 | Hudson ..................... 359/775 |
| 3,449,040 | A | * | 6/1969 | Ruben ...................... 359/775 |
| 3,507,560 | A | * | 4/1970 | Baker ...................... 359/775 |
| 5,015,079 | A | * | 5/1991 | Minefuji ................... 359/775 |
| 2006/0087748 | A1 | | 4/2006 | Choi et al. |
| 2007/0008625 | A1 | | 1/2007 | Park et al. |
| 2008/0186594 | A1 | * | 8/2008 | Jeong et al. .............. 359/775 |

FOREIGN PATENT DOCUMENTS

| JP | 4-238312 | 8/1992 |
| JP | 8-327899 | 12/1996 |
| JP | 2007-17984 | 1/2007 |

OTHER PUBLICATIONS

Office Action mailed on Feb. 28, 2008 and issued in corresponding Korean Patent Application No. 10-2007-0024274.
UK Patent Office Search Report, mailed May 30, 2008 and issued in corresponding UK Patent Application No. GB0802022.4.

* cited by examiner

*Primary Examiner*—Darryl J Collins

(57) ABSTRACT

There is provided a subminiature imaging optical system installed in a mobile telecommunication terminal or a PDA, or used in a surveillance camera or a digital camera. The subminiature imaging optical system including: first, second, third and fourth lenses sequentially positioned from an object side to an image side, the first lens having positive refractive power, the second lens having negative refractive power, the third lens having negative refractive power, and the fourth lens having positive refractive power, wherein each of the third and fourth lenses has at least one aspherical surface. The subminiature imaging optical system corrects chromatic aberration superbly to reduce color fringing significantly, thereby achieving high resolution and compactness as well.

2 Claims, 5 Drawing Sheets

SUBMINIATURE IMAGING OPTICAL SYSTEM

CROSS-REFERENCE TO RELATED APPLICATIONS

This application claims the priority of Korean Patent Application No. 2007-24274 filed on Mar. 13, 2007, in the Korean Intellectual Property Office, the disclosure of which is incorporated herein by reference.

BACKGROUND OF THE INVENTION

1. Field of the Invention

The present invention relates to a subminiature imaging optical system, and more particularly, to a subminiature imaging optical system installed in a mobile telecommunication terminal or a personal digital assistant (PDA), or used in a surveillance camera or a digital camera.

2. Description of the Related Art

Recently, regarding an image pickup system, studies have been conducted on camera modules for telecommunication terminals, digital still cameras (DSCs), camcorders, and personal computer (PC) cameras which are attached to personal computers as an imaging device. Here, an image-forming lens system is the most important component of such an image pickup system to obtain an image.

The lens system needs to be high-performing in terms of resolution and image quality, thus complicating a lens configuration. However, such structural and optical complexity leads to increase in size, posing a difficulty to compactness and thinness of the lens system.

For example, a camera module should necessarily be miniaturized to be installed in a mobile phone more efficiently. Also, a charge coupled device (CCD) or a complementary metal oxide semiconductor (CMOS) used in the camera module as an image sensor is gradually increased in resolution and reduced in pixel size. In turn, the lens system included in the camera module needs to be smaller-sized and thinner while attaining high resolution and superior optical capabilities.

Here, in a case where the CCD or CMOS with 3 million pixels is employed, only three sheets of lenses may be arranged to satisfy optical capabilities and miniaturization. However, in a case where three sheets of lenses or less are applied to a high-resolution imaging device such as the CCD or CMOS with at least 5 million pixels, each of the lenses should be increased in refractive power, and thus is hard to be machined. This as a result renders it difficult to achieve both high performance and miniaturization of the lens system. Thus, four sheets of lenses may be employed, but when a spherical lens is utilized in this configuration, the optical lens system is increased in total length, thereby hardly miniaturizable.

Therefore there has been a demand for a lens system for a camera module which can be subminiaturized and realize optical capabilities.

SUMMARY OF THE INVENTION

An aspect of the present invention provides a subminiature imaging optical system suitably applicable to a subminiature optical instrument such as a mobile phone camera using an image sensor such as a charge coupled device (CCD) or a complementary metal oxide semiconductor (CMOS).

An aspect of the present invention also provides a subminiature imaging optical system capable of correcting chromatic aberration to significantly reduce color fringing.

An aspect of the present invention also provides a subminiature imaging optical system which employs aspherical lenses to ensure high resolution and achieve various optical characteristics.

According to an aspect of the present invention, there is provided a subminiature imaging optical system including: first, second, third and fourth lenses sequentially positioned from an object side to an image side, the first lens having positive refractive power, the second lens having negative refractive power, the third lens having negative refractive power, and the fourth lens having positive refractive power, wherein each of the third and fourth lenses has at least one aspherical surface.

The first lens may have an Abbe number greater than Abbe numbers of the second and third lenses, respectively and the fourth lens may have an Abbe number greater than the Abbe numbers of the second and third lenses, respectively.

The first to fourth lenses may have the Abbe numbers satisfying following conditions 1 to 4, respectively, $$v_1 \geq 50 \qquad \text{condition 1,}$$

$$v_2 \leq 40 \qquad \text{condition 2,}$$

$$v_3 \leq 40 \qquad \text{condition 3,}$$

$$v_4 \geq 50 \qquad \text{condition 4,}$$

where $v_1$, $v_2$, $v_3$, and $v_4$ are the respective Abbe numbers of the first to fourth lenses.

The optical system may have an overall size satisfying following condition 5, the first lens may have refractive power satisfying following condition 6 and the second lens may have refractive power satisfying following condition 7, $$0.85 < OL/D < 1.05 \qquad \text{condition 5.}$$

$$F1/F \leq 0.68 \qquad \text{condition 6,}$$

$$|F2/F| \leq 1.1 \qquad \text{condition 7,}$$

where OL is a distance from an object side of the first lens to an image plane, D is an effective optical size of the image plane, F is an effective focal length of a total optical system, and F1 is a focal length of the first lens, and F2 is a focal length of the second lens.

The third lens may have refractive power satisfying following condition 8, $$|F3/F1| > 5 \qquad \text{condition 8,}$$

where F is a focal length of the first lens and F3 is a focal length of the third lens.

The fourth lens may be made of plastic.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
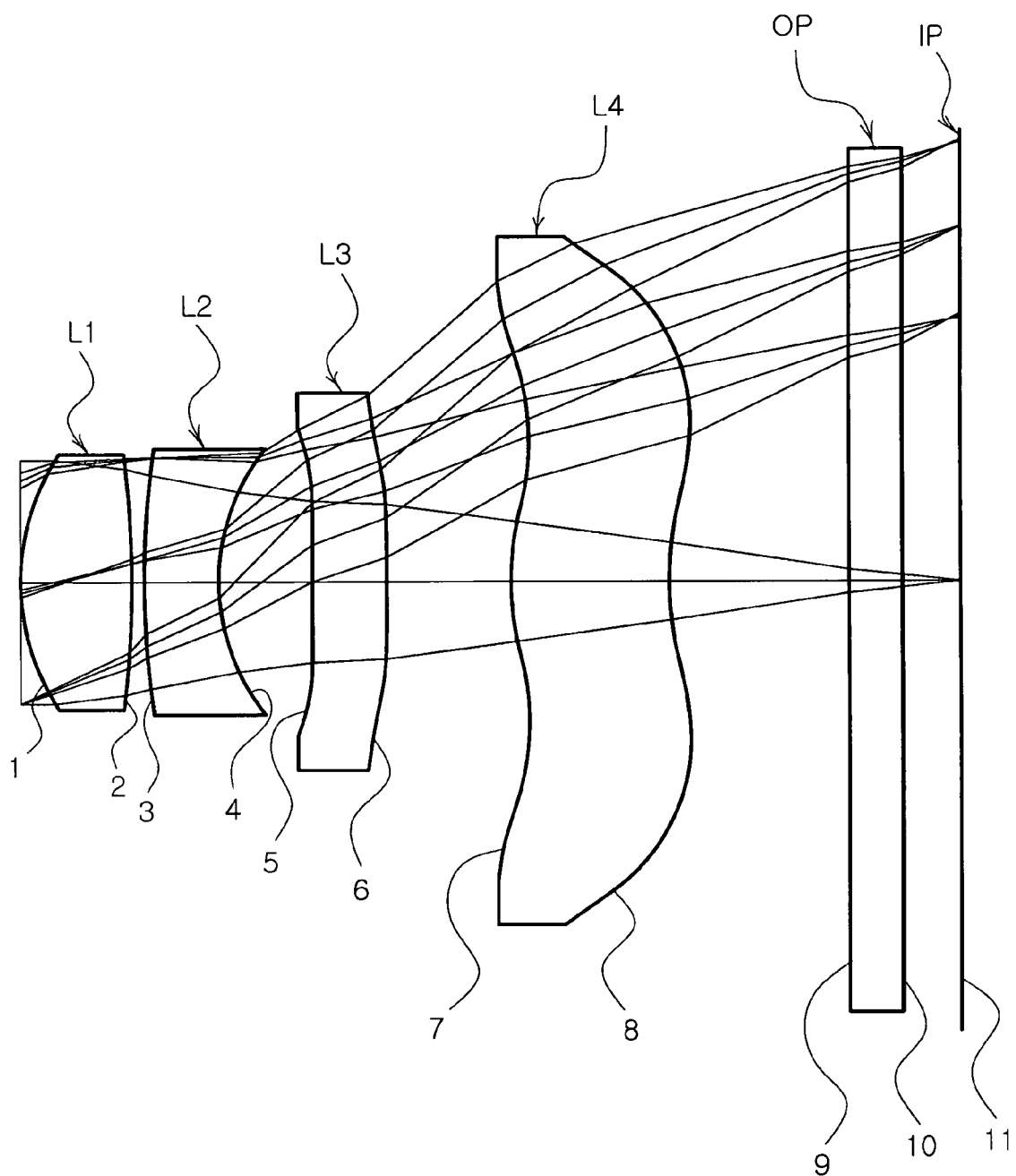
FIG. 1 is a lens configuration view illustrating a subminiature imaging optical system according to first and second embodiments of the invention.

FIG. 1 is a lens configuration view illustrating a subminiature imaging optical system according to first and second embodiments of the invention. In the following lens configuration views, the thicknesses, sizes and shapes of the lenses may be exaggerated for clarity. In particular, the shapes of spherical or aspherical surfaces shown in the views are only exemplary and should not be construed as limiting.

Meanwhile, the lenses of the first and second embodiments may be similar in shape as shown in FIG. 1 but are different in optical characteristics as described in numerical examples later.

As shown in FIG. 1, the subminiature imaging optical system of the present invention includes a first lens L1 having positive refractive power, a second lens L2 having negative refractive power, a third lens L3 having negative refractive power and a fourth lens L4 having positive refractive power. The first to fourth lenses L1 to L4 are sequentially positioned from an object side to an image side.

Here, each of the third and fourth lenses L3 and L4 has at least one aspherical surface. Particularly, the fourth lens L4 may be made of plastic.

Meanwhile, an optical filter OF such as an infrared ray filter, a cover glass and the like may be provided between the fourth lens LG4 and an image plane IP.

The image plane IP corresponds to an image sensor such as a charge coupled device (CCD) or a complementary metal oxide semiconductor (CMOS).

In the subminiature imaging optical system of the present invention, the first lens L1 and fourth lens L4 each having positive refractive power are formed of a material having a great Abbe number. Also, the second lens L2 and third lens L3 each having negative refractive power are formed of a material having a small Abbe number. This allows the lenses to be complementary with one another, and thus free from chromatic aberration. This also miniaturizes the optical system, and optimizes radius of curvature of aspheric surfaces and refractive surfaces, thereby leading to superior aberrational characteristics and high resolution.

Moreover, in the present embodiment, the first lens L1 and the second lens L2 have respective refractive powers defined appropriately to ensure a short focal length between the first lens L1 and the second lens L2, thereby producing a compact imaging optical system.

Particularly, according to the present invention, aspherical lenses are employed to improve resolution and reduce distortion and spherical aberration, thereby realizing a compact optical system superior in optical characteristics.

Furthermore, some lenses are formed of plastic to easily manufacture the aspherical lenses at a low cost.

With this overall configuration, operational effects of following conditions 1 to 8 will be examined hereunder.

$v_1 \geq 50$ condition 1, $v_2 \leq 40$ condition 2, $v_3 \leq 40$ condition 3, $v_4 \geq 50$ condition 4, where $v_1$, $v_2$, $v_3$, and $v_4$ are Abbe numbers of the first to fourth lenses, respectively.

Conditions 1 to 4 prescribe the Abbe numbers of the first to fourth lenses L1 to L4, respectively and pertain to correction of chromatic aberration of the optical system.

In the present embodiment, the first lens L1 and fourth lens L4 with positive refractive powers have Abbe numbers relatively greater than the second lens L2 and third lens L3 with negative refractive powers, respectively. This allows the lenses to be complementary with one another and thus free from chromatic aberration.

Notably, with satisfaction of conditions 1 to 4, chromatic aberration can be inhibited efficiently. That is, when the first lens L1 and fourth lens L4 with positive refractive powers have the respective Abbe numbers smaller than 50, or when the second lens L2 and third lens L3 with negative refractive powers have the respective Abbe numbers greater than 40, the lenses cannot correct chromatic aberration sufficiently, thereby deteriorating resolution.

$0.85 < OL/D < 1.05$ condition 5.

$F1/F \leq 0.68$ condition 6, $|F2/F| \leq 1.1$ condition 7, where OL is a distance from an object-side surface of the first lens to the image plane, D is an effective optical size of the image plane, F is an effective focal length of a total optical system, F1 is a focal length of the first lens, F2 is a focal length of the second lens.

Conditions 5 to 7 pertain to compactness of the imaging optical system. Condition 5 governs an overall size of the imaging optical system, and conditions 6 and 7 prescribe refractive power of the first lens and refractive power of the second lens, respectively.

Condition 5 defines a value obtained by dividing an overall length from the object-side surface 1 of the first lens L1 to the image plane IP by the effective optical size of the image sensor, i.e., image plane. The value of condition 5 indicates a compactness degree of the optical system. Deviation from an upper limit of condition 5 increases height of the optical system, thereby hampering compactness thereof. Meanwhile, deviation from a lower limit of condition 5 shortens length of the optical system too much, thus rendering aberration hardly correctable. This also results in more manufacturing tolerance, thereby degrading performance of the optical system.

Conditions 6 and 7 denote ratios of the first and second lenses L1 and L2 to the total focal length, respectively. Conditions 6 and 7 prescribe refractive powers of the first and second lenses L1 and L2.

When the first and second lenses L1 and L2 are decreased in refractive powers in a deviation from conditions 6 and 7, the overall length of the optical system is increased to hamper miniaturization thereof and add to chromatic aberration.

$|F3/F1| > 5$ condition 8, where F1 is a focal length of the first lens and F3 is a focal length of the third lens.

Condition 8 denotes a ratio between the focal length of the third lens L3 and the focal length of the first lens L1. Condition 8 governs relative refractive power of the third lens L3.

The third lens L3 is deposited to correct curvature of the image plane. When the focal length of the third lens L1 is five times or less the focal length of the first lens L1, the curvature of the image plane occurs considerably so that a central portion of the image plane with highest resolution deviates greatly from peripheral portions of the image plane with highest resolution.

Now, the present invention will be examined in greater detail through specific numerical examples.

As described above, in the following first and second embodiments, a first lens L1 has positive refractive power, a second lens L2 has negative refractive power, a third lens L3 has negative refractive power and the fourth lens L4 has positive refractive power. A fourth lens L4 is formed of plastic. Particularly, in the first and second embodiments, each of the third lens L3 and the fourth lens L4 has both surfaces formed of aspherical surfaces. Likewise, each of the first lens L1 and the second lens L2 has both surfaces formed of aspherical surfaces. Also, an optical filter OF such as an infrared ray filter, a cover glass and the like may be provided between the fourth lens LG4 and an image plane IP. The image plane IP corresponds to an image sensor such as a CCD and a CMOS.

Aspherical coefficients used in each of the embodiments herein are obtained from following Equation 1, and "E and a number following the E" used in a conic constant K and aspherical coefficients A, B, C and D represent a 10's power. For example, E+01 and E−02 represent $10^1$ and $10^{-2}$, respectively.

$$Z = \frac{cY^2}{1+\sqrt{1-(1+K)c^2r^2}} + Ar^3 + Br^4 + Cr^5 + Dr^6 + Er^7 + Fr^8 + Gr^9 + Hr^{10} + Ir^{11} + Jr^{12} + \ldots,$$ Equation 1 where Z is a distance from a vertex of a lens in an optical axis, r is a distance in a direction perpendicular to the optical axis, C is a reciprocal number of a radius R of curvature at the vertex of the lens, K is a conic constant and A, B, C, D, E, F, G, H, I, and J are aspherical coefficients.

First Embodiment

Table 1 below shows numerical values of a lens system configured as in FIG. 1 according to a first embodiment of the present invention.

Figure 2:
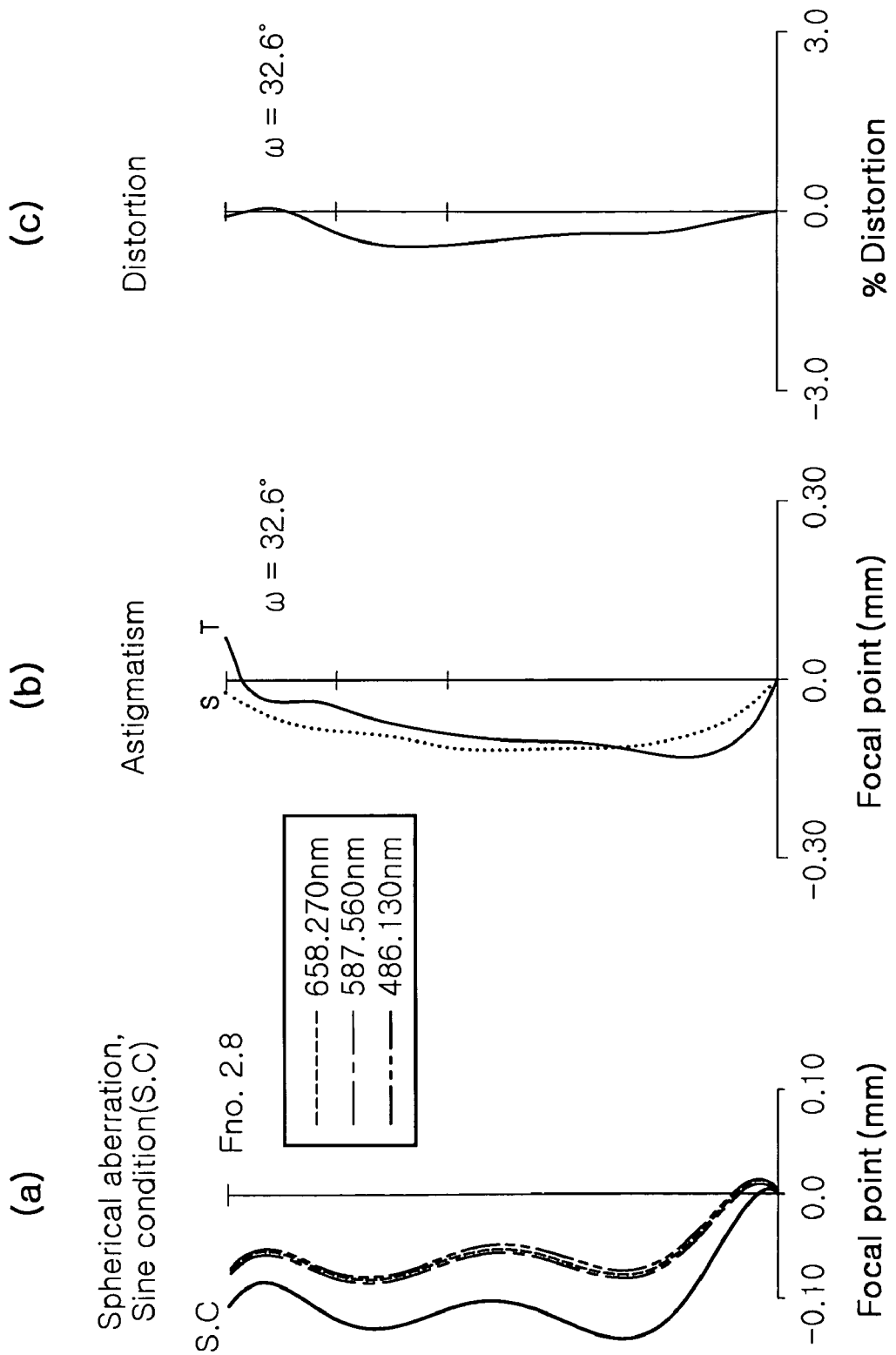
FIG. 2 is an aberrational diagram illustrating the first embodiment of the invention, in which A represents spherical aberration, B represents astigmatism and C represents distortion.
Figure 3:
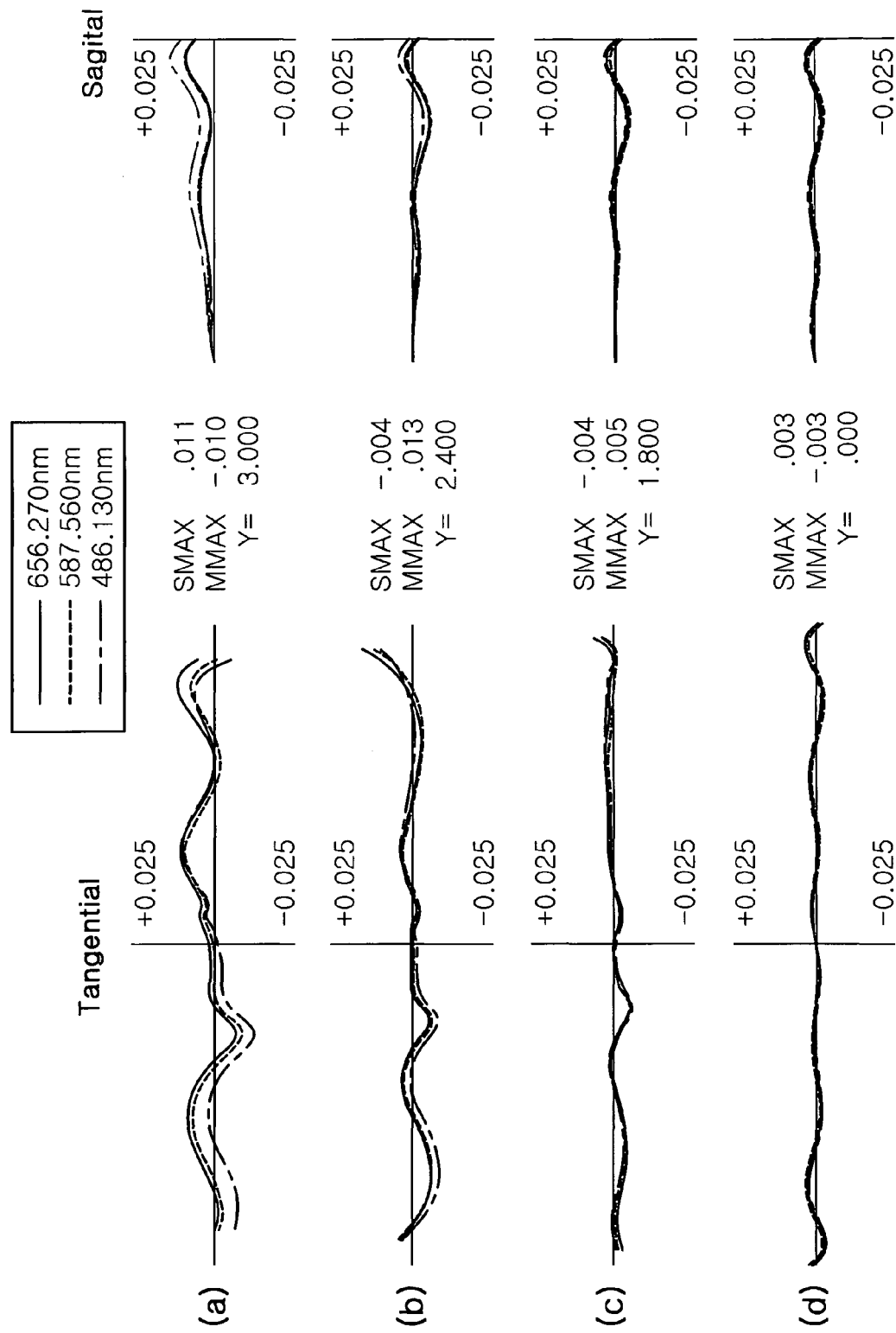
FIGS. 3A to 3D are diagrams illustrating coma aberration in each field according to the first embodiment of the invention.

Also, FIGS. 2A to 2C represent spherical aberration/sine condition S.C, astigmatism and distortion, respectively according to the first embodiment shown in Table 1a and FIG. 1. FIGS. 3A to 3D represent coma aberration in each field according to the first embodiment.

In the following diagrams showing astigmatism, "S" represents sagital and "T" represents tangential.

In the first embodiment, an F number Fno is 2.8, an angle of view is 65.2 degrees, a distance OL from the object-side surface 1 of the first lens L1 to the image plane IP is 5.22 mm, an effective focal length f is 4.69 mm, and an effective optical size of the image plane is 6.0 mm.

TABLE 1

| Surface No. | Radius of curvature(R) | Thickness or distance (t) | Refractive index ($N_d$) | Focal point distance (mm) | Abbe number ($v_d$) | Remark |
|---|---|---|---|---|---|---|
| *1 | 1.7724 | 0.6348 | 1.544 | 2.979 | 55.9 | First lens |
| *2 | −16.6008 | 0.0690 | | | | |
| *3 | 4.1382 | 0.4152 | 1.632 | −4.030 | 23.3 | Second lens |
| *4 | 1.5160 | 0.5205 | | | | |
| *5 | 12.8276 | 0.4146 | 1.632 | −68.710 | 23.3 | Third lens |
| *6 | 9.7797 | 0.6974 | | | | |
| *7 | 2.0149 | 0.8993 | 1.544 | 12.435 | 55.9 | Fourth lens |
| *8 | 2.4180 | 1.0000 | | | | |
| 9 | ∞ | 0.3000 | 1.523 | — | 54.3 | Optical filter |
| 10 | ∞ | 0.3333 | | | | |
| 11 | ∞ | 0 | — | — | — | Image plane |

In Table 1, * represents an aspherical surface, and in the first embodiment, each of the first to fourth lenses L1 to L4 has both surfaces 1 to 8 formed of aspherical surfaces.

Values of aspherical coefficients in the first embodiment according to Equation 1 are noted in Table 2 below.

TABLE 2

| | Surface No. | | | | | | | |
|---|---|---|---|---|---|---|---|---|
| | 1 | 2 | 3 | 4 | 5 | 6 | 7 | 8 |
| K | −0.2236E+01 | −0.5000E+01 | −0.8197E+00 | −0.1994E+01 | −0.1665E+02 | −0.1000E+01 | −0.1079E+01 | −0.8239E+00 |
| A | −0.1046E+00 | −0.2006E+00 | −0.9580E−01 | −0.3264E−01 | −0.7151E−01 | −0.7578E−01 | 0.9167E−01 | 0.1290E+00 |
| B | 0.6806E+00 | 0.5195E+00 | 0.6344E−01 | 0.7450E−01 | −0.3720E−01 | −0.2145E+00 | −0.5673E+00 | −0.5273E+00 |
| C | −0.1914E+01 | −0.4327E+00 | −0.5474E−01 | −0.4069E+00 | −0.1681E+00 | 0.1294E+00 | 0.7089E+00 | 0.5108E+00 |
| D | 0.3000E+01 | −0.3598E+00 | 0.2013E+00 | 0.8386E+00 | 0.1837E+00 | 0.1746E+00 | −0.8608E+00 | −0.1282E+00 |
| E | −0.2366E+01 | 0.5723E+00 | −0.2709E+00 | −0.3707E+01 | 0.4456E+00 | −0.2773E+00 | 0.9947E+00 | −0.4320E+00 |

TABLE 2-continued

| | Surface No. | | | | | | | |
|---|---|---|---|---|---|---|---|---|
| | 1 | 2 | 3 | 4 | 5 | 6 | 7 | 8 |
| F | 0.7198E+00 | 0.2293E+00 | −0.4780E−01 | −0.4081E+00 | −0.4576E+00 | 0.3052E+00 | −0.8732E+00 | 0.7173E+00 |
| G | — | −0.2749E+00 | 0.1507E+00 | 0.1309E+00 | −0.3564E+00 | −0.1665E+00 | 0.5213E+00 | −0.5506E+00 |
| H | — | −0.2841E+00 | 0.5796E−01 | 0.2631E+00 | 0.2499E+00 | −0.1187E+00 | −0.1949E+00 | 0.2352E+00 |
| I | — | −0.5465E−01 | −0.3340E−01 | 0.3513E−01 | 0.3802E+00 | 0.1896E+00 | 0.4075E−01 | −0.5370E−01 |
| J | — | 0.2511E+00 | −0.5298E−02 | −0.9971E−01 | −0.2622E+00 | −0.6339E−01 | −0.3625E−02 | 0.5114E−02 |

Second Embodiment

Table 3 below shows numerical values of a lens system configured as in FIG. 1 according to a second embodiment of the present invention.

Figure 4:
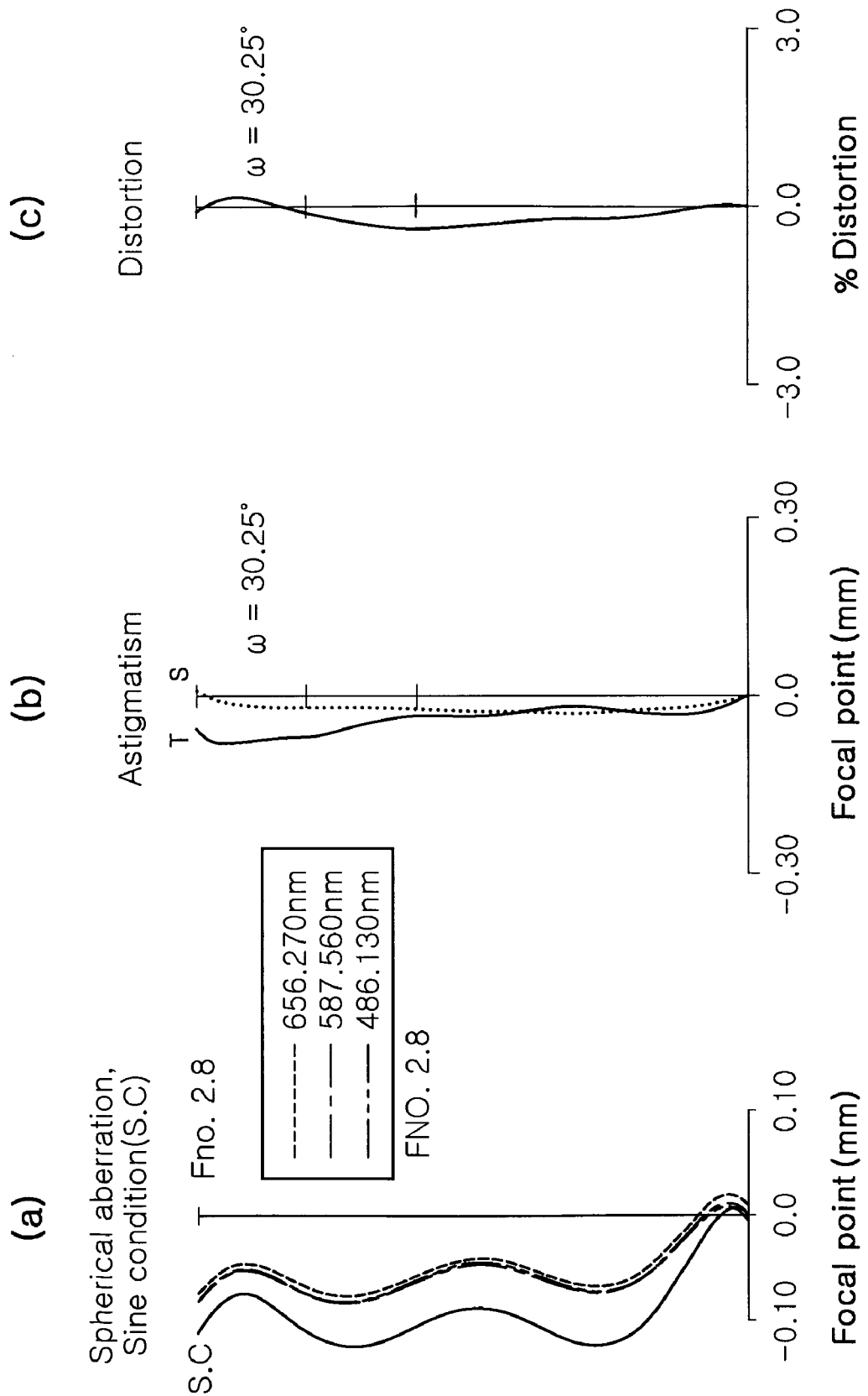
FIG. 4 is an aberrational diagram illustrating the second embodiment of the invention, in which A represents spherical aberration, B represents astigmatism and C represents distortion.
Figure 5:
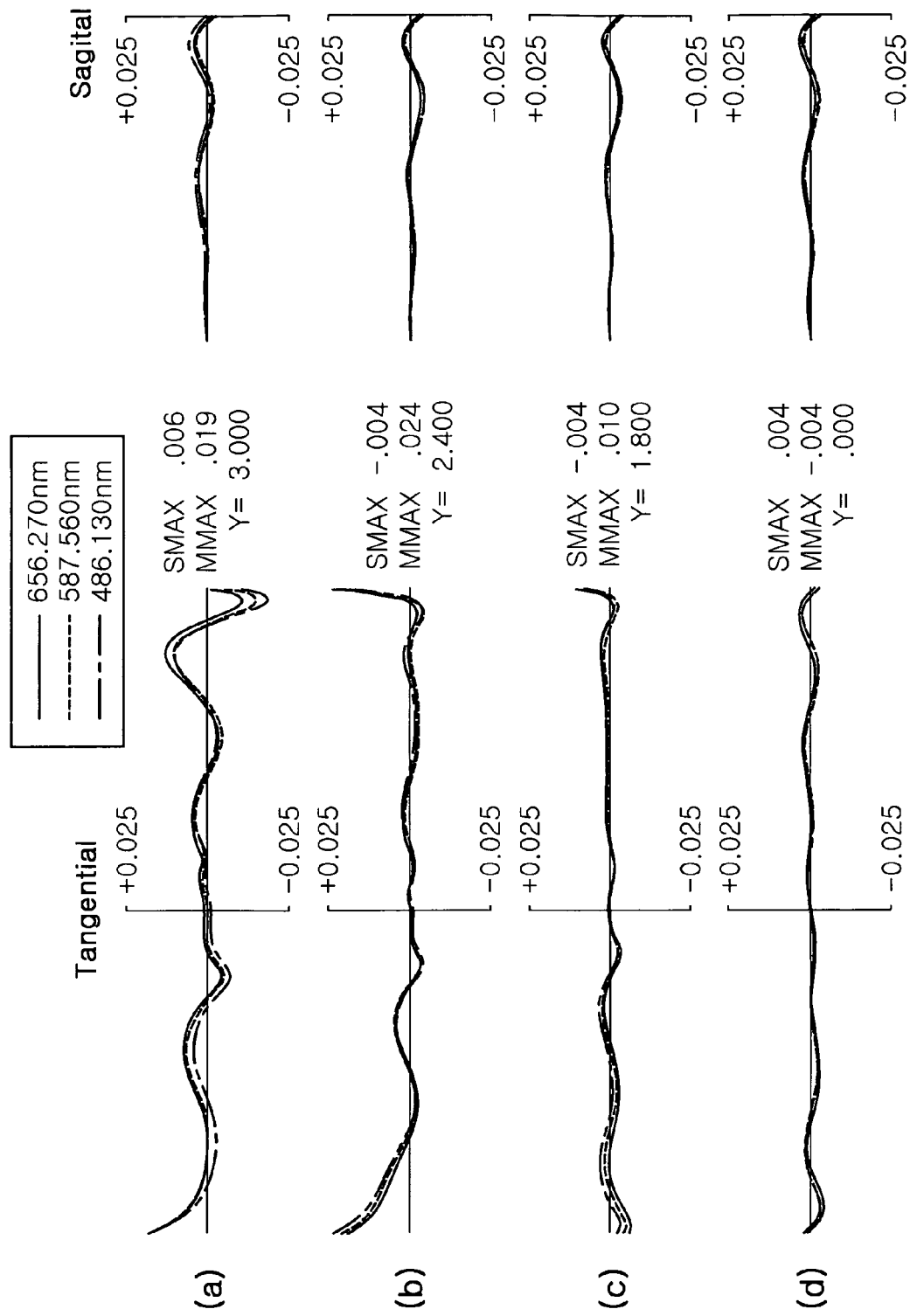
FIGS. 5A to 5D are diagrams illustrating coma aberration in each field according to the second embodiment of the invention.

Also, FIGS. 4A to 4C represent spherical aberration/sine condition S.C, astigmatism and distortion, respectively according to the second embodiment shown in Table 3 and FIG. 1. FIGS. 5A to 5D represent coma aberration in each field according to the second embodiment. FIG. 4 represents power distribution in each field of the third lens L3 according to the second embodiment.

In the second embodiment, an F number Fno is 2.8, an angle of view is 60.5 degrees, a distance OL from the object-side surface 1 of the first lens L1 to the image plane IP is 5.65 mm, an effective focal length f is 5.15 mm, and an effective optical size of the image plane is 6.0 mm.

TABLE 3

| Surface No. | Radius of curvature(R) | Thickness or distance (t) | Refractive index ($N_d$) | Focal point distance (mm) | Abbe number ($v_d$) | Remark |
|---|---|---|---|---|---|---|
| *1 | 1.9718 | 0.6696 | 1.544 | 3.410 | 55.9 | First lens |
| *2 | −27.9670 | 0.0731 | | | | |
| *3 | 3.4409 | 0.4688 | 1.632 | −4.718 | 23.3 | Second lens |
| *4 | 1.5135 | 0.5952 | | | | |
| *5 | 12.8034 | 0.4337 | 1.632 | −200.561 | 23.3 | Third lens |
| *6 | 11.4762 | 0.8337 | | | | |
| *7 | 2.1428 | 0.9125 | 1.544 | 15.972 | 55.9 | Fourth lens |
| *8 | 2.4180 | 1.000 | | | | |
| 9 | ∞ | 0.3000 | 1.523 | — | 54.3 | Optical filter |
| 10 | ∞ | 0.4334 | | | | |
| 11 | ∞ | 0 | — | — | — | Image plane |

In Table 3, * represents an aspherical surface, and like the first embodiment, in the second embodiment each of the first to fourth lenses L1 to L4 has both surfaces 1 to 8 formed of aspherical surfaces.

Values of aspherical coefficients in the second embodiment according to Equation 1 are noted in Table 4 below.

TABLE 4

| | Surface No. | | | | | | | |
|---|---|---|---|---|---|---|---|---|
| | 1 | 2 | 3 | 4 | 5 | 6 | 7 | 8 |
| K | −0.2902E+01 | −0.3000E+01 | 0.4316E+00 | −0.1676E+01 | −0.7591E+00 | −0.1000E+01 | −0.1004E+01 | −0.1355E+01 |
| A | −0.8511E−01 | −0.1724E+00 | −0.8622E−01 | −0.3770E−01 | −0.7512E−01 | −0.4779E−01 | 0.9147E−01 | 0.1139E+00 |
| B | 0.5351E+00 | 0.4064E+00 | 0.4339E−01 | 0.7382E−01 | 0.2566E−01 | −0.1787E+00 | −0.4446E+00 | −0.4173E+00 |
| C | −0.1385E+01 | −0.3218E+00 | −0.2947E−01 | −0.2995E+00 | −0.1831E+00 | 0.1136E+00 | 0.5120E+00 | 0.3742E+00 |
| D | 0.2005E+01 | −0.2376E+00 | 0.1272E+00 | 0.5424E+00 | 0.1320E+00 | 0.1043E+00 | −0.5744E+00 | −0.8794E−01 |
| E | −0.1454E+01 | 0.3672E+00 | −0.1773E+00 | −0.2374E+00 | 0.2832E+00 | −0.1770E+00 | 0.6125E+00 | −0.2650E+00 |
| F | 0.4039E+00 | 0.1344E+00 | −0.2869E−01 | −0.2234E+00 | −0.2568E+00 | 0.1729E+00 | −0.4960E+00 | 0.4075E+00 |
| G | — | −0.1543E+00 | 0.8523E−00 | 0.8789E−01 | −0.1866E+00 | −0.8496E−01 | 0.2730E+00 | −0.2885E+00 |
| H | — | −0.1520E+00 | 0.3695E−01 | 0.1399E+00 | 0.1189E+00 | −0.5505E−01 | −0.9417E−01 | 0.1136E+00 |
| I | — | −0.2943E−01 | −0.1588E−01 | 0.1729E−01 | 0.1675E+00 | 0.8543E−01 | 0.1816E−01 | −0.2394E−01 |
| J | — | 0.1175E+00 | −0.8712E−02 | −0.5998E−01 | −0.1058E+00 | −0.2747E−01 | −0.1488E−02 | 0.2109E−02 |

As can be seen from the above embodiments, the subminiature imaging optical system with excellent aberrational characteristics as shown in FIGS. 2 to 5 is obtained according to the present invention.

In the meantime, values of conditions 1 to 8 for the above first and second embodiments are noted in Table 5.

TABLE 5

|  | First embodiment | Second embodiment |
|---|---|---|
| Condition 1 ($v_1 \geq 50$) | 55.9 | 55.9 |
| Condition 2 ($v_2 \leq 40$) | 23.3 | 23.3 |
| Condition 3 ($v_3 \leq 40$) | 23.3 | 23.3 |
| Condition 4 ($v_4 \geq 50$) | 55.9 | 55.9 |
| Condition 5 (0.85 < OL/D < 1.05) | 0.8700 | 0.9417 |
| Condition 6 (F1/F ≤ 0.68) | 0.6351 | 0.6621 |
| Condition 7 (|F2/F| ≤ 1.1) | 0.8593 | 0.9161 |
| Condition 8 (|F3/F1| > 5) | 23.0645 | 58.820 |

As can be seen in Table 5 above, the first and second embodiments of the present invention satisfy conditions 1 to 8.

As set forth above, according to exemplary embodiments of the invention, in a subminiature imaging optical system adopting four sheets of lenses, first and fourth lenses each having positive refractive power are formed of a material having a high Abbe number and second and third lenses each having negative refractive power are formed of a material having a low Abbe number. This allows the lenses to be complementary with one another and thus free from chromatic aberration. This also miniaturizes the optical system and optimizes radius of curvature of aspherical surfaces and refractive surfaces, thereby achieving excellent aberrational characteristics and high resolution.

In addition, aspherical lenses are employed to attain high resolution and improve various optical characteristics. Particularly, the aspherical lenses are formed of plastic to reduce weight of the imaging optical system, thereby allowing the optical system to be easily manufactured in mass-production at a lower cost.

While the present invention has been shown and described in connection with the exemplary embodiments, it will be apparent to those skilled in the art that modifications and variations can be made without departing from the spirit and scope of the invention as defined by the appended claims.

What is claimed is:

1. A subminiature imaging optical system comprising:
first, second, third and fourth lenses sequentially positioned from an object side to an image side, the first lens having positive refractive power, the second lens having negative refractive power, the third lens having negative refractive power, and the fourth lens having positive refractive power,
wherein each of the third and fourth lenses has at least one aspherical surface,
wherein the first lens has an Abbe number greater than Abbe numbers of the second and third lenses, respectively and the fourth lens has an Abbe number greater than the Abbe numbers of the second and third lenses, respectively,
wherein the first to fourth lenses have the Abbe numbers satisfying following conditions 1 to 4, the optical system has an overall size satisfying following condition 5, the first lens has refractive power satisfying following condition 6, the second lens has refractive power satisfying following condition 7, and the third lens has refractive power satisfying following condition 8, $v_1 \geq 50$            condition 1, $v_2 \leq 40$            condition 2, $v_3 \leq 40$            condition 3, $v_4 \geq 50$            condition 4, $0.85 < OL/D < 1.05$            condition 5, $F1/F \leq 0.68$            condition 6, $|F2/F| \leq 1.1$            condition 7, $|F3/F1| > 5$            condition 8, where $v_1$, $v_2$, $v_3$, and $v_4$ are the respective Abbe numbers of the first to fourth lenses, OL is a distance from an object side of the first lens to an image plane, D is an effective optical size of the image plane, F is an effective focal length of a total optical system, F1 is a focal length of the first lens, F2 is a focal length of the second lens, and F3 is a focal length of the third lens.

2. The subminiature imaging optical system of claim 1, wherein the fourth lens is made of plastic.

* * * * *